(12) United States Patent
Morrell et al.

(10) Patent No.: US 11,613,342 B2
(45) Date of Patent: Mar. 28, 2023

(54) AIRCRAFT WING WITH WING TIP DEVICE

(71) Applicant: Airbus Operations Limited, Bristol (GB)

(72) Inventors: Paul Morrell, Bristol (GB); Matt Harding, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 450 days.

(21) Appl. No.: 16/832,639

(22) Filed: Mar. 27, 2020

(65) Prior Publication Data

US 2020/0307762 A1    Oct. 1, 2020

(30) Foreign Application Priority Data

Mar. 29, 2019    (GB) ..................... 1904486

(51) Int. Cl.
*B64C 3/56*    (2006.01)

(52) U.S. Cl.
CPC ...................... *B64C 3/56* (2013.01)

(58) Field of Classification Search
CPC ............... B64C 3/56; B64C 2201/102; Y10T 403/32893; Y10T 403/32918; E05B 63/0056; Y10S 292/15
See application file for complete search history.

(56) References Cited

U.S. PATENT DOCUMENTS

| 809,062 A   | * | 1/1906 | Ingalls ............... E05B 63/20 |
|             |   |        |                           292/181 |
| 3,463,521 A | * | 8/1969 | Helton ............... E02F 9/2866 |
|             |   |        |                           404/124 |
| 5,395,143 A | * | 3/1995 | Chesterton .......... E05C 17/48 |
|             |   |        |                            292/57 |
| 2018/0148159 A1 |  | 5/2018 | Good et al. |
| 2019/0186184 A1 | * | 6/2019 | Bremmer ............ E05D 5/10 |

FOREIGN PATENT DOCUMENTS

| EP | 2 727 828 | 5/2014 |
| EP | 2 899 119 | 7/2015 |
| EP | 3 069 988 | 9/2016 |
| EP | 3 357 808 | 8/2018 |
| GB | 2557978 | 7/2018 |
| GB | 2565809 | 2/2019 |
| GB | 2565812 | 2/2019 |
| WO | 2015/150835 | 10/2015 |

OTHER PUBLICATIONS

Search Report for GB 1904486.6, dated Sep. 25, 2019, 4 pages.

* cited by examiner

*Primary Examiner* — Richard Green
*Assistant Examiner* — Madison Elizabeth Dittner
(74) *Attorney, Agent, or Firm* — Nixon & Vanderhye P.C.

(57) ABSTRACT

An aircraft wing having a fixed wing and a wing tip device at the tip of the fixed wing is disclosed. The wing tip device being movable relative to the fixed wing between flight and ground configurations, the aircraft wing having a locking mechanism including a locking bore and a locking pin, the locking mechanism being configurable between a locked configuration, in which the locking pin is received in the locking bore, to lock the wing tip device in one of the flight or ground configurations, and an unlocked configuration in which the locking pin is withdrawn from the locking bore such that the wing tip device is moveable relative to the fixed wing, and wherein the locking pin is configured such that it has a replaceable tip.

20 Claims, 9 Drawing Sheets

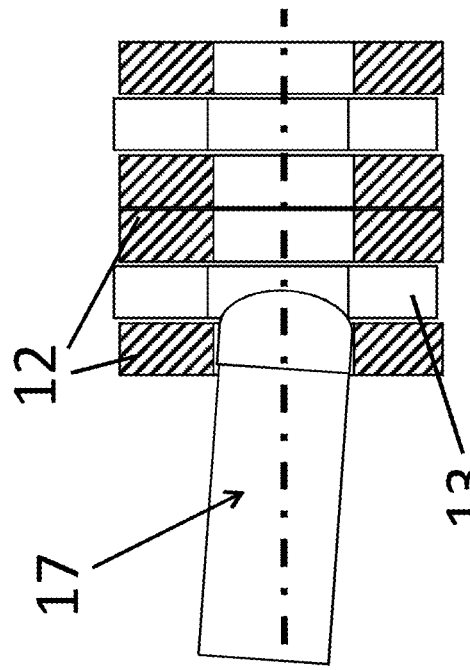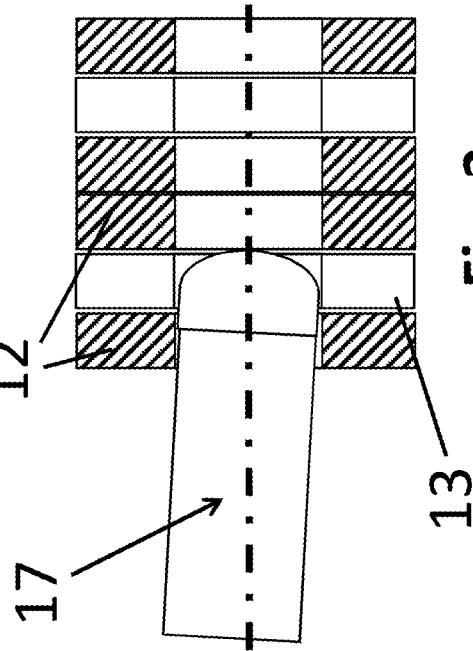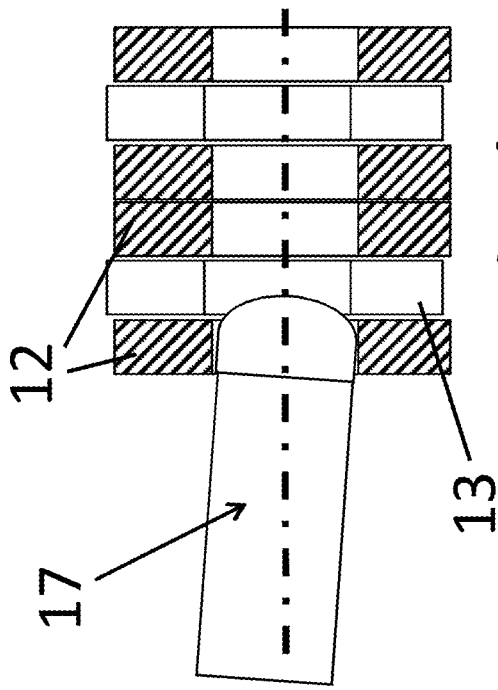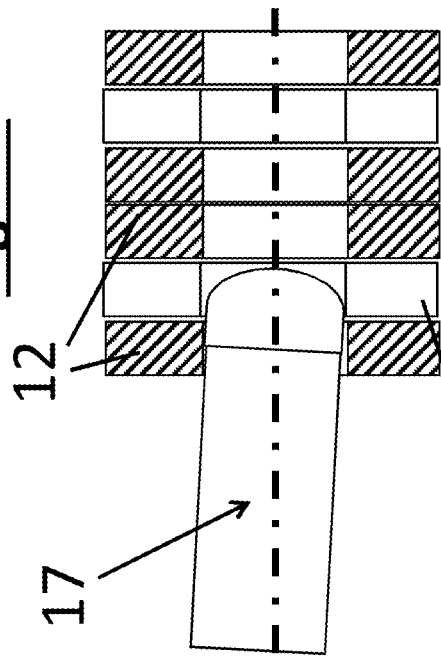

AIRCRAFT WING WITH WING TIP DEVICE

CROSS RELATED APPLICATION

This application claims priority to United Kingdom (GB) Patent Application 1904486.6, filed Mar. 29, 2019, the entire contents of which is hereby incorporated by reference.

BACKGROUND OF THE INVENTION

The present invention relates to an aircraft wing comprising a fixed wing and a wing tip device that is movable relative to the fixed wing between a flight and ground configuration, to an aircraft comprising such an aircraft wing, to a method of locking and unlocking such a wing tip device in the flight or ground configurations, to a method of changing the configuration of a wing tip device from one of a flight or ground configuration to the other and to a method of replacing the tip of a locking pin of a locking mechanism of an aircraft wing with wing tip device.

There is a trend towards increasingly large passenger aircraft with higher performance efficiency (for example fuel burn reduction), for which it is desirable to have correspondingly large wing spans. However, the maximum aircraft span is effectively limited by airport operating rules which govern various clearances required when manoeuvring around the airport (such as the span and/or ground clearance required for gate entry and safe taxiway usage).

In some suggested designs an aircraft wing comprises a fixed wing and a wing tip device at the tip of the fixed wing, the wing tip device being rotatable relative to the fixed wing between a flight configuration for use during flight, and a ground configuration for use during ground-based operations, in which ground configuration the wing tip device is rotated relative to the fixed wing such that the span of the wing is reduced. The aircraft wing may comprise a locking mechanism having a locking bore and a locking pin, the locking mechanism being configurable between a locked configuration, in which the locking pin is received in the locking bore, to lock the wing tip device in one of the flight or ground configurations, and an unlocked configuration in which the locking pin is withdrawn from the locking bore such that the wing tip device is moveable from the one of the flight or ground configurations to the other of the flight and ground configurations.

However it has been identified that, in the above described arrangement, the locking pin may not necessarily line up with the locking bore. This may, for example, be due to factors such as tolerances, deflections, wear effects and/or temperature changes.

This can result in a degree of misalignment between the locking pin and locking bore which may cause wear of the locking pin, due to contact of the locking pin against a surface that defines the locking bore, thereby requiring replacement of the locking pin, which can be relatively time consuming and expensive.

The present invention seeks to address or mitigate at least some of the above mentioned problems. Alternatively, or additionally, the present invention seeks to provide an improved aircraft wing comprising a fixed wing and a wing tip device that is movable relative to the fixed wing between a flight and ground configuration.

Alternatively, or additionally, the present invention seeks to provide an improved aircraft comprising such an aircraft wing. Alternatively, or additionally, the present invention seeks to provide an improved method of locking and unlocking such a wing tip device in the flight or ground configurations. Alternatively, or additionally, the present invention seeks to provide an improved method of changing the configuration of a wing tip device from one of a flight or ground configuration to the other. Alternatively, or additionally, the present invention seeks to provide an improved method of replacing the tip of a locking pin of a locking mechanism of an aircraft wing with wing tip device.

SUMMARY OF THE INVENTION

According to a first aspect of the invention there is provided an aircraft wing comprising a fixed wing and a wing tip device at the tip of the fixed wing, the wing tip device being movable relative to the fixed wing between:
  a flight configuration for use during flight, and
  a ground configuration for use during ground-based operations, in which ground configuration the wing tip device is moved relative to the fixed wing such that the span of the wing is reduced,
  the aircraft wing having a locking mechanism comprising a locking bore and a locking pin, the locking mechanism being configurable between a locked configuration, in which the locking pin is received in the locking bore, to lock the wing tip device in one of the flight or ground configurations, and an unlocked configuration in which the locking pin is withdrawn from the locking bore such that the wing tip device is moveable relative to the fixed wing,
  wherein the locking pin is configured such that it has a replaceable tip.

Providing the locking pin with a replaceable tip may advantageously allow the tip to be replaced, for example due to wear of the tip, in a relatively simple, fast and cost effective way. In this respect, the tip of the pin (which is typically the part of the pin that is subject to the most wear) may be replaced without having to replace the body of the pin.

In embodiments of the invention the locking pin is configured such that the tip is interchangeable with another tip.

The locking pin may comprise a body and the tip. Optionally the locking pin is configured such that the tip is detachable from the body and the body is attachable to a replacement tip. Optionally the locking pin is configured such that the tip is detachable from the body and a corresponding replacement tip is attachable to the body. It will be appreciated that corresponding replacement tip refers to a replacement tip comprising a, or at least part of, a corresponding cooperating connector.

Optionally the body comprises a connector and the locking pin comprises a cooperating connector, wherein the connector and cooperating connector are disengageable and engageable with each other such that the tip is detachable from the body and a replacement tip is attachable to the body by engaging the connector and a cooperating connector with each other. The replacement tip may be attachable to the body by engaging the connector of the body and a cooperating connector associated with the replacement tip, with each other.

It will be appreciated that a 'corresponding' cooperating connector is an identical cooperating connector (to the cooperating connector of the tip being replaced). The replacement tip may comprise the, or at least part of, the corresponding cooperating connector.

Optionally the locking pin comprises a body and the locking pin is configured such that the tip is releasably attachable to the body. Optionally the locking pin is configured such that the tip is attachable to and detachable from the body. Optionally the locking pin is configured such that the tip is selectively attachable to and detachable from the body.

Optionally the body comprises the connector. Optionally the tip comprises at least part of the cooperating connector. The tip may comprise the entire cooperating connector.

In this respect, the locking pin may comprise a connector and a cooperating connector, wherein the connector is engageable with and disengageable from the cooperating connector such that the tip is selectively attachable to and detachable from the body. The connector and cooperating connector may be a male and female connector. The connector and cooperating connector may be of any suitable type. The connector and cooperating connector may be mechanical connectors. The connector and/or cooperating connector may be a mechanical fastener. Optionally one of the connector or cooperating connector is receivable in the other to attach the tip to the body and the one of the connector or cooperating connector is removable from the other to detach the tip from the body. Optionally the connector or cooperating connector is not an adhesive.

By way of example, the cooperating connector may comprise a fastener used to attach the tip to the body. It will be appreciated that the 'locking pin' refers to the assembled locking pin (where the tip is attached to the body), i.e. to the body, tip, connector and cooperating connector. As an illustrative example, aligned holes may be provided in the body and tip that receive a fastener (e.g. a screw, pin, etc.), that is selectively engageable with the holes, to selectively attach and detach the tip to/from the body. It will be appreciated that, in this case, the hole in the body may form the connector, with the fastener and the hole in the tip forming the cooperating connector, i.e. a cooperating connector associated with the tip. The locking pin (i.e. the assembled locking pin) comprises the body and its connector, the tip and the cooperating connector formed by the hole in the tip and by the fastener.

As a further illustrative example, where a resilient member (e.g. a circlip) is used to attach the tip to the body, it will be appreciated that a surface of the body that is acted on by the resilient member, to attach the body to the tip, may form the connector, with the cooperating connector being formed by the resilient member and a surface of the tip that that is acted on by the resilient member to attach the tip to the body, i.e. a cooperating connector associated with the tip.

The tip may comprise the cooperating connector. For example, one of the body and tip may comprise a screw thread and the other a complimentary screw thread, one may comprise a male connector and the other a female connector, etc. As a further example, the body and tip may be releasably attachable by an interference fit. It will be appreciated that, in this case, the abutting surfaces of the body and tip form the connector and cooperating connectors respectively.

Optionally the locking pin is configured such that the tip is selectively attachable to and detachable from the body. The locking pin may comprise a means of selectively attaching and detaching the tip to/from the body.

Optionally the locking pin is configured such that the tip is selectively attachable and detachable.

Optionally the locking pin comprises a means of selectively attaching and detaching the tip of the locking pin.

In embodiments of the invention the tip is not integrally formed with the body. In this respect, the body and tip form first and second parts of the locking pin. The first and second parts are detachable from and attachable to each other.

In embodiments of the invention, when the tip is attached to the body it is translationally fixed relative to the body (i.e. as the body translates, the tip translates with it). When the tip is attached to the body, it may be rotationally fixed relative to the body.

In embodiments of the invention the tip comprises the tip end of the locking pin. In this respect, it will be appreciated that the 'tip end' refers to the front most end of the locking pin. The term 'front' is in relation to the direction the locking pin moves, relative to the locking bore, as it is received in the locking bore. In this respect, the front end of the locking pin is the end of the locking pin that is received first in the locking bore, as the locking pin is received in the locking bore. The rear end of the locking pin is the opposite end.

The tip may be a front part of the locking pin. The tip may extend rearwardly from the tip end. It will be appreciated that the tip terminates at the locking pin body and therefore terminates forward of the rear end of the locking pin. The tip may extend, rearwardly from the tip end, along less than or equal to 50% of the length of the locking pin, optionally along less than or equal to 25% of the length of the locking pin.

In embodiments of the invention the tip is an axially extending section that, along its axial length, extends around substantially the entire circumference of the locking pin.

The tip may be the part of the locking pin that, as the locking pin is received in the locking bore, contacts a surface, for example a surface that defines the locking bore or a surface of a bush provided in the locking bore.

In embodiments of the invention the body is an axially extending section that, along its axial length, extends around substantially the entire circumference of the locking pin.

In embodiments of the invention the tip and body are front and rear sections of the locking pin respectively. In embodiments of the invention the tip is proximal the tip end and the body is distal the tip end.

Optionally the replaceable tip is of a material that is softer than a surface that the tip comes into contact with as the locking pin is received in the locking bore. In this respect, optionally a surface that the tip comes into contact with as the locking pin is received in the locking bore, is of greater hardness than the replaceable tip.

This may cause wear to occur on the tip, as opposed to the surface that the tip comes into contact with as the locking pin is received in the locking bore. The surface that the tip comes into contact with may be a surface that defines the locking bore (e.g. a inner surface of a lug that defines the locking bore or a surface of a bush provided in the locking bore).

A bush may be provided in the locking bore. In this case, the tip may be of a material that is softer than the bush. The bush may be of a material that is softer than a surface that defines the locking bore. In this respect, optionally a surface that defines the locking bore is of greater hardness than the bush.

The tip may be of a material that is softer than that of the body. In this respect, optionally the body is of a material that is of greater hardness than the tip.

Where 'hardness' is referred to, this may be the scratch hardness, indentation hardness and/or rebound hardness.

The locking pin and/or locking bore may be movably mounted such that as the locking mechanism is moved to the locked configuration, the locking pin and/or locking bore can align itself with the locking bore and/or locking pin respectively. The locking pin and/or locking bore may be movably mounted such that it can rotate so as to align itself with the locking bore or locking pin respectively. The locking pin and/or locking bore may be movably mounted such that it can translate so as to align itself with the locking bore or locking pin respectively.

The locking pin may be movably mounted such that as the locking mechanism is moved to the locked configuration, the locking pin can align itself with the locking bore. The locking pin may be movably mounted such that it can rotate so as to align itself with the locking bore. The locking pin may be movably mounted such that it can translate so as to align itself with the locking bore.

The replaceable tip is particularly advantageous where the above movably mounted arrangement is used, due to the relatively high degree of wear that can occur on the tip, due to the contact of the tip and the surface of the locking bore (or of a bush in the locking bore) as the pin and bore are being urged into alignment.

Optionally at least one of the locking pin has a surface, or the locking bore is defined by a surface, that is configured to urge the locking pin and locking bore into alignment, as the locking mechanism is moved to the locked configuration.

As with the above, the replaceable tip is particularly advantageous in such an arrangement, due to the relatively high degree of wear that can occur on the tip, due to the contact of the tip and the surface of the locking bore (or of a bush in the locking bore) as the pin and bore are being urged into alignment.

The locking pin and/or locking bore may be tapered such that the locking pin and locking bore are urged into alignment as the locking mechanism is moved to the locked configuration.

The locking pin and/or locking bore may be movable so as to move the locking mechanism between its locked and unlocked configurations.

In this respect, the locking pin may be movable between a locked position, in which it is received in the locking bore to lock the wing tip device in the one of the flight or ground configurations and an unlocked configuration in which the locking pin is withdrawn from the locking bore such that the wing tip device is moveable from the one of the flight or ground configurations to the other of the flight and ground configurations.

Alternatively, or additionally, the locking bore (e.g. a lug provided with the locking bore) may be movable between a locked position in which the locking pin is received in the locking bore to lock the wing tip device in the one of the flight or ground configurations and an unlocked configuration in which the locking pin is withdrawn from the locking bore such that the wing tip device is moveable from the one of the flight or ground configurations to the other of the flight and ground configurations.

The locking pin may be associated with the fixed wing and the locking bore may be associated with the wing tip device. In this respect, the locking pin may be mounted to the fixed wing, optionally for movement between its locked and unlocked positions. The locking bore may be provided in a lug. In this respect, an inner surface of the lug may define the locking bore. The lug may be attached to the wing tip device such that it moves with the wing tip device, as the wing tip device moves between the flight and ground configurations.

Alternatively, the locking pin may be associated with the wing tip device and the locking bore associated with the fixed wing.

Where the locking bore is provided in a lug, the lug may be movably mounted so as to provide said movable mounting of the locking bore.

The locking bore may be a first locking bore and wherein the locking mechanism comprises a second locking bore, wherein in the locked configuration the locking pin is received in the first and second locking bores to lock the wing tip device in one of the flight or ground configurations, and in the unlocked configuration the locking pin is withdrawn from at least one of the first and second locking bores such that the wing tip device is moveable from the one of the flight or ground configurations to the other of the flight and ground configurations.

The first locking bore may be associated with the wing tip device. In this respect, the first locking bore may be provided in a first lug, that is attached to the wing tip device such that the lug moves with the wing tip device, as the wing tip device moves between the flight and ground configurations.

The second locking bore may be associated with the fixed wing. In this respect, the second locking bore may be provided in a second lug, that is attached to the fixed wing.

Alternatively, the first locking bore may be associated with the fixed wing and the second locking bore may be associated with the wing tip device.

The locking mechanism may comprise a third locking bore wherein in the locked configuration the locking pin is received in the first, second and third locking bores to lock the wing tip device in one of the flight or ground configurations, and in the unlocked configuration the locking pin is withdrawn from at least one of the first, second and third locking bores such that the wing tip device is moveable from the one of the flight or ground configurations to the other of the flight and ground configurations.

Optionally the third locking bore is provided in a third lug.

Optionally the first and third lugs are associated with one of the fixed wing and the wing tip device and the second lug is associated with the other of the fixed wing and wing tip device. In this respect, optionally the first and third lugs are attached to one of the fixed wing and the wing tip device and the second lug is attached to the other of the fixed wing and wing tip device. Optionally the first and third lugs are provided either side of the second lug. This may advantageously provide a double shear arrangement.

The second and third locking bores may have any of the features of the locking bore.

The locking mechanism may comprise a set of first locking bores that comprise a plurality of said first locking bores. The locking mechanism may comprise a set of second locking bores that comprise a plurality of said second locking bores. The locking mechanism may comprise a plurality of pairs of said first and second locking bores.

In embodiments of the invention, when the wing tip device is in the other of the flight and ground configurations, the locking bore is not aligned with the locking pin, such that the locking pin cannot be received in the locking bore. In embodiments of the invention, when the wing tip device is in the other of the flight and ground configurations, the first and second locking bores are not aligned with each other, such that the locking pin cannot be received in both the first and second locking bores.

When the wing tip device is in the other of the flight and ground configurations, the locking pin may be received in one of the first and second locking bores, optionally the locking bore associated with the fixed wing.

In embodiments of the invention, in the unlocked configuration the locking pin is withdrawn from the locking bore such that the wing tip device is moveable from the one of the flight or ground configurations to the other of the flight or ground configurations.

Optionally the locking mechanism is a first locking mechanism and the aircraft wing comprises a second said locking mechanism, wherein the second locking mechanism is configured to selectively lock and unlock the wing tip device in/from the other of the flight or ground configurations.

The second locking mechanism may comprise any or all of the features of the first locking mechanism. In this respect, optionally the second locking mechanism comprises a locking bore and a locking pin, the locking mechanism being configurable between a locked configuration, in which the locking pin is received in the locking bore, to lock the wing tip device in the other of the flight or ground configurations, and an unlocked configuration in which the locking pin is withdrawn from the locking bore such that the wing tip device is moveable from the other of the flight or ground configurations to the one of the flight and ground configurations, wherein the locking pin comprises a replaceable tip.

The locking pin of the first locking mechanism may also be the locking pin of the second locking mechanism. Alternatively, the locking pin of the second locking mechanism may be a different pin to the locking pin of the first locking mechanism, i.e. the locking pin of the first locking mechanism is a first pin and the locking pin of the second locking mechanism is a second pin (that is not the first pin).

Optionally the wing tip device is rotatable relative to the fixed wing between the flight and ground configurations. In this respect, optionally in the ground configuration the wing tip device is rotated relative to the fixed wing such that the span of the wing is reduced (relative to the flight configuration).

Optionally the aircraft wing comprises a rotational joint that rotatably couples the wing tip device to the fixed wing, to allow the wing tip device to rotate relative to the fixed wing between the flight and ground configurations. The rotational joint may be of any suitable type, including a 'piano-hinge' type or a slew-ring type, for example.

Optionally in the locked configuration the locking mechanism locks the wing tip device in the flight configuration.

Optionally in the locked configuration the locking mechanism locks the wing tip device in the ground configuration.

According to a second aspect of the invention there is provided an aircraft comprising an aircraft wing according to the first aspect of the invention.

Optionally the aircraft comprises an actuator configured to move the locking mechanism between its locked and unlocked configurations. The aircraft wing may comprise the actuator.

Optionally the aircraft comprises an actuator configured to move the wing tip device, relative to the fixed wing, between its flight and ground configurations. The aircraft wing may comprise the actuator.

Optionally the aircraft comprises a control unit to control operation of the locking mechanism. The aircraft wing may comprise the control unit.

The aircraft may have a pair of aircraft wings according to the first aspect of the invention.

According to a third aspect of the invention there is provided an aircraft wing comprising a fixed wing and a wing tip device at the tip of the fixed wing, the wing tip device being movable relative to the fixed wing between:
  a flight configuration for use during flight, and
  a ground configuration for use during ground-based operations, in which ground configuration the wing tip device is moved relative to the fixed wing such that the span of the wing is reduced,
  the aircraft wing having a locking mechanism comprising a locking bore and a locking pin, the locking mechanism being configurable between a locked configuration, in which the locking pin is received in the locking bore, to lock the wing tip device in one of the flight or ground configurations, and an unlocked configuration in which the locking pin is withdrawn from the locking bore such that the wing tip device is moveable relative to the fixed wing,
  wherein the locking pin comprises a body and a tip that is selectively attachable to the body.

In embodiments of the invention the tip is selectively attachable to and detachable from the body. In embodiments of the invention the tip is releasably attachable to the body.

According to a fourth aspect of the invention there is provided a combination of an aircraft wing according to the first aspect of the invention and a replacement tip for the locking pin.

According to a fifth aspect of the invention there is provided a kit of parts comprising a fixed wing and a wing tip device configured to be mounted at the tip of the fixed wing and to be movable relative to the fixed wing between:
  a flight configuration for use during flight, and
  a ground configuration for use during ground-based operations, in which ground configuration the wing tip device is moved relative to the fixed wing such that the span of the wing is reduced,
  the kit of parts comprising a locking bore and a locking pin configured to, in use, form a locking mechanism configurable between a locked configuration, in which the locking pin is received in the locking bore, to lock the wing tip device in one of the flight or ground configurations, and an unlocked configuration in which the locking pin is withdrawn from the locking bore such that the wing tip device is moveable relative to the fixed wing,
  wherein the locking pin is configured such that it has a replaceable tip.

Optionally the locking pin comprises a body and the locking pin is configured such that the tip is detachable from the body and the body is attachable to a replacement tip.

Optionally the tip is detached from the body.

Optionally the kit of parts further comprises a replacement tip for the locking pin.

According to a sixth aspect of the invention there is provided a method of locking a wing tip device of an aircraft wing in a flight or ground configuration, the aircraft wing comprising a fixed wing and a wing tip device at the tip of the fixed wing, the wing tip device being movable relative to the fixed wing between:
  a flight configuration for use during flight, and
  a ground configuration for use during ground-based operations, in which ground configuration the wing tip device is moved relative to the fixed wing such that the span of the wing is reduced,
  the aircraft wing having a locking mechanism comprising a locking bore and a locking pin, the locking mechanism being configurable between a locked configuration, in which the locking pin is received in the locking bore, to lock the wing tip device in one of the flight or ground configurations, and an unlocked configuration in which the locking pin is withdrawn from the locking bore such that the wing tip device is moveable relative to the fixed wing,
  wherein the locking pin is configured such that it has a replaceable tip, and the method comprises moving the locking mechanism from its unlocked configuration to its locked configuration.

According to a seventh aspect of the invention there is provided a method of unlocking a wing tip device of an aircraft wing from a flight or ground configuration, the aircraft wing comprising a fixed wing and a wing tip device at the tip of the fixed wing, the wing tip device being movable relative to the fixed wing between:

a flight configuration for use during flight, and a ground configuration for use during ground-based operations, in which ground configuration the wing tip device is moved relative to the fixed wing such that the span of the wing is reduced, the aircraft wing having a locking mechanism comprising a locking bore and a locking pin, the locking mechanism being configurable between a locked configuration, in which the locking pin is received in the locking bore, to lock the wing tip device in one of the flight or ground configurations, and an unlocked configuration in which the locking pin is withdrawn from the locking bore such that the wing tip device is moveable relative to the fixed wing, wherein the locking pin is configured such that it has a replaceable tip, and the method comprises moving the locking mechanism from its locked configuration to its unlocked configuration.

According to an eighth aspect of the invention there is provided a method of changing the configuration of a wing tip device from one of a flight or ground configuration to the other of a flight or ground configuration, wherein the method comprises unlocking the wing tip device from one of the flight or ground configurations according to the method of the seventh aspect of the invention, moving the wing tip device to the other of the flight or ground configurations and locking the wing tip device in that configuration according to the method of the sixth aspect of the invention.

According to a ninth aspect of the invention there is provided a method of replacing a tip of a locking pin of a locking mechanism of an aircraft wing, the aircraft wing comprising a fixed wing and a wing tip device at the tip of the fixed wing, the wing tip device being movable relative to the fixed wing between:

a flight configuration for use during flight, and a ground configuration for use during ground-based operations, in which ground configuration the wing tip device is moved relative to the fixed wing such that the span of the wing is reduced, the aircraft wing having a locking mechanism comprising a locking bore and a locking pin, the locking mechanism being configurable between a locked configuration, in which the locking pin is received in the locking bore, to lock the wing tip device in one of the flight or ground configurations, and an unlocked configuration in which the locking pin is withdrawn from the locking bore such that the wing tip device is moveable relative to the fixed wing, wherein the locking pin is configured such that it has a replaceable tip, and wherein the method comprises replacing the tip of the locking pin.

In embodiments of the invention the method comprises detaching the tip of the locking pin from the body of the locking pin and attaching a replacement tip (i.e. a different tip) to the body of the locking pin. In embodiments of the invention the replacement tip is less worn than the tip it is replacing.

Optionally the aircraft and/or the rotational joint is arranged such that the majority of the aerodynamic and inertial loads on the wing tip device during use of the aircraft, are transferred to the fixed wing, via the rotational joint. Optionally substantially all the aerodynamic and inertial loads on the wing tip device during use of the aircraft, are transferred to the fixed wing, via the rotational joint.

In the flight configuration, the span may exceed an airport compatibility limit. In the ground configuration the span may be reduced such that the span (with the wing tip device in the ground configuration) is less than, or substantially equal to, the airport compatibility limit. The airport compatibility limit is a span limit (for example relating to clearance restrictions for buildings, signs, other aircraft). The compatibility limit is preferably a gate limit.

The wing tip device may be a wing tip extension; for example the wing tip device may be a planar tip extension. In other embodiments, the wing tip device may comprise, or consist of, a wing tip fence, a swept wing tip, a split wing tip, a non-planar device, such as a winglet, etc.

In the flight configuration the trailing edge of the wing tip device is preferably a continuation of the trailing edge of the fixed wing. The leading edge of the wing tip device is preferably a continuation of the leading edge of the fixed wing. There is preferably a smooth transition from the fixed wing to the wing tip device. It will be appreciated that there may be a smooth transition, even where there are changes in sweep or twist at the junction between the fixed wing and wing tip device. However, there are preferably no discontinuities at the junction between the fixed wing and wing tip device. The upper and the lower surfaces of the wing tip device may be continuations of the upper and lower surfaces of the fixed wing.

When the wing tip device is in the ground configuration, the aircraft incorporating the wing, may be unsuitable for flight. For example, the wing tip device may be aerodynamically and/or structurally unsuitable for flight in the ground configuration. The aircraft is preferably configured such that, during flight, the wing tip device is not moveable to the ground configuration. The aircraft may comprise a sensor for sensing when the aircraft is in flight. When the sensor senses that the aircraft is in flight, a control system is preferably arranged to disable the possibility of moving the wing tip device to the ground configuration.

The aircraft may be any air vehicle such as a manned aircraft or a UAV. More preferably the aircraft is a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft is preferably a powered aircraft. The aircraft preferably comprises an engine for propelling the aircraft. The aircraft may comprise wing-mounted, and preferably underwing, engines.

It will of course be appreciated that features described in relation to one aspect of the present invention may be incorporated into other aspects of the present invention. For example, the method of any aspect of the invention may incorporate any of the features described with reference to the apparatus of any aspect of the invention and vice versa.

Other preferred and advantageous features of the invention will be apparent from the following description.

DESCRIPTION OF THE DRAWINGS

Embodiments of the present invention will now be described by way of example only with reference to the accompanying drawings of which:

FIG. 2a shows a side view of a locking pin of a locking mechanism of a rotational joint of an aircraft wing of the passenger aircraft shown in FIG. 1, where the locking pin is in an assembled configuration;

FIG. 2b shows a rear view of the locking pin shown in FIG. 2a;

FIG. 2c shows a view corresponding to that of FIG. 2a, but where the locking pin is in a disassembled configuration (where the tip of locking pin is shown in phantom, for illustrative purposes) and also showing a replacement tip (17b');

FIG. 2d shows a rear view of the tip of the locking pin, when detached from the body of the locking pin, in the disassembled configuration;

FIGS. 3a to 3i are schematic views, showing a side view of the locking pin and a cross-sectional view of the lugs of the locking mechanism, that sequentially show the locking mechanism moving from an unlocked configuration to a locked configuration, where the locking pin was initially misaligned with the locking bores in the lugs and where the lugs of the wing tip device and the lugs of the fixed wing were initially misaligned with each other;

DETAILED DESCRIPTION

Figure 1A:
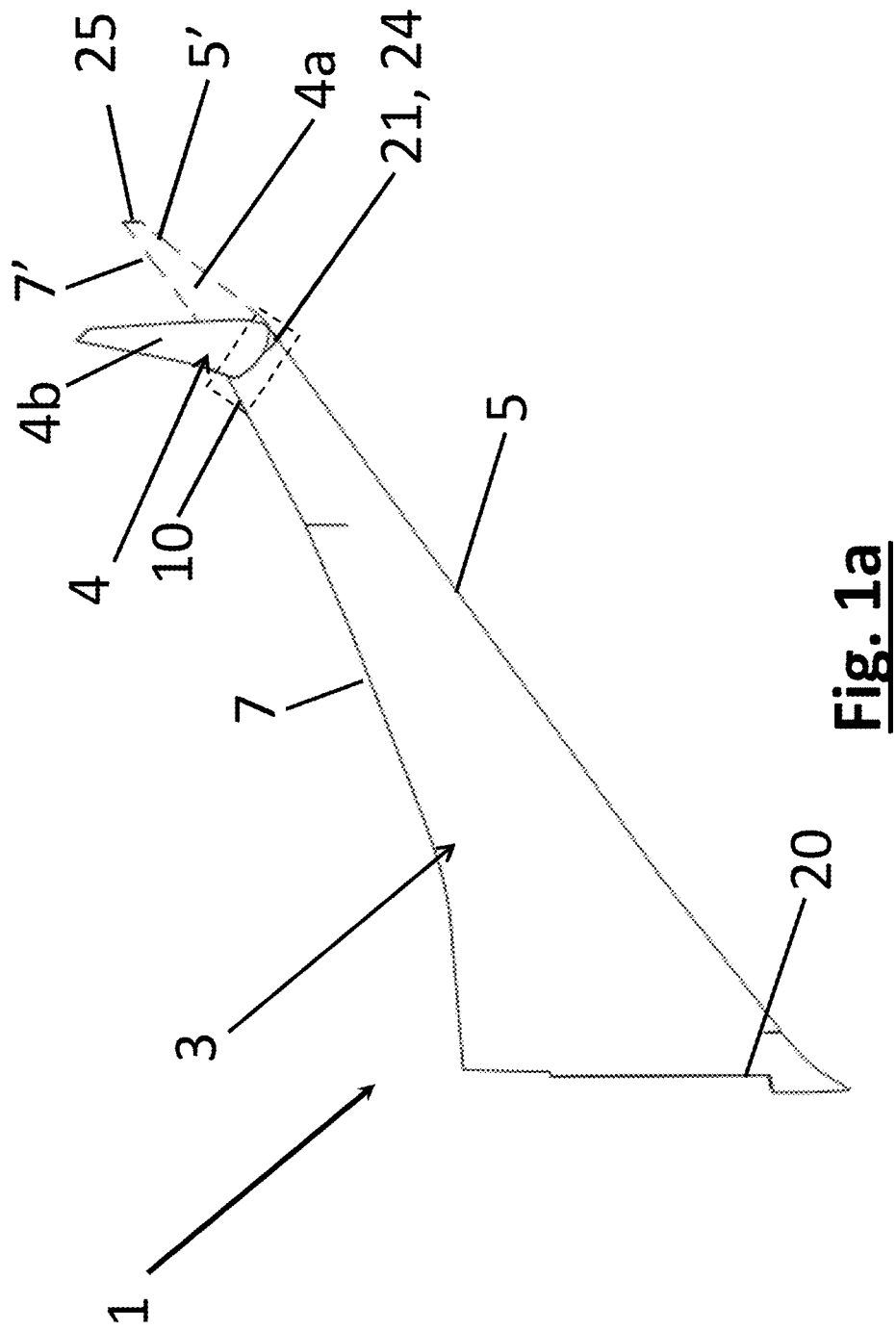
FIG. 1a shows a perspective view of a swept wing of a passenger aircraft according to a first embodiment of the invention, where a wing tip device of the wing is shown in a flight configuration (shown as a dotted line) and in a ground configuration (shown as a solid line)

FIG. 1a is a perspective view of an aircraft wing 1 of an aircraft 2 according to a first embodiment of the invention. The aircraft wing 1 comprises a fixed wing 3 and a wing tip device 4.

Figure 1B:
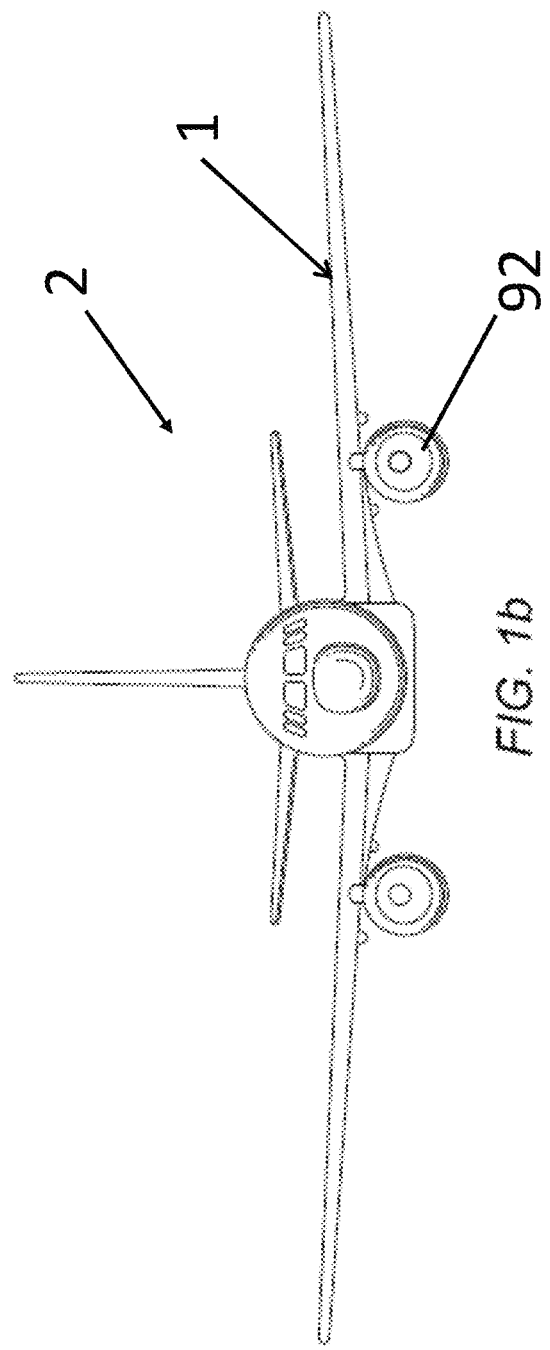
FIG. 1b shows a front view of the passenger aircraft, where the wing tip device is in the flight configuration.

The aircraft 2 is a passenger aircraft comprising a passenger cabin comprising a plurality of rows and columns of seat units for accommodating a multiplicity of passengers, in this case more than 50 passengers. The aircraft is a powered aircraft and comprises engines 92, mounted under the wings 1, for propelling the aircraft 2 (see FIG. 1b).

The fixed wing 3 extends outboard from the fuselage of the aircraft, in a span wise direction from a root 20 to a tip 21. The fixed wing 3 also extends in a chord-wise direction from a leading edge 5 to a trailing edge 7.

The wing tip device 4 is located at the outboard tip 21 of the fixed wing 3. In the described embodiment the wing tip device 4 is in the form of a planar wing tip extension, although the invention is also applicable to other types of wing tip device (e.g. a wing tip fence, a swept wing tip, a split wing tip, a non-planar wing tip device such as a winglet, etc.).

The wing tip device 4 is moveable between a flight configuration 4a (shown as a dotted line in FIG. 1a) and a ground configuration 4b (shown as a solid line in FIG. 1a). When the wing tip device 4 is in the flight configuration 4a it extends outboard in a span wise direction, from an inboard end 24, located at the tip 21 of the fixed wing 3, to a tip 25. The wing tip device 4 also extends in a chord-wise direction from a leading edge 5' to a trailing edge 7'.

In the flight configuration 4a, the leading and trailing edges 5', 7' of the wing tip device 4 are continuations of the leading and trailing edges 5, 7 of the fixed wing 3. Furthermore, the upper and lower surfaces of the wing tip device 4 device are continuations of the upper and lower surfaces of the fixed wing 3. Thus, there is a smooth transition from the fixed wing 3 to the wing tip device 4.

It will be appreciated that there may be a smooth transition, even where there are changes in sweep or twist at the junction between the fixed wing 3 and wing tip device 4. However, there are preferably no discontinuities at the junction between the fixed wing 3 and wing tip device 4.

The wing tip device 4 is placed in the flight configuration for flight. In the flight configuration the wing tip device 4 thus increases the span of the aircraft (thereby providing beneficial aerodynamic effects, for example, reducing the component of induced drag and increasing the lift). In principle, it would be desirable to maintain this large span at all times and simply have a large fixed wing. However, the maximum aircraft span is effectively limited by airport operating rules which govern various clearances required when manoeuvring around the airport (such as the span and/or ground clearance required for gate entry and safe taxiway usage). In this regard, in the flight configuration 4a the span may exceed an airport compatibility gate limit. Thus the wing tip device 4 is moveable to the ground configuration 4b for use when the aircraft 2 is on the ground.

In the ground configuration 4b the wing tip device 4 is folded, from the above-mentioned flight configuration, such that the wing tip device 4 rotates upwardly. When the wing tip device 4 is in the ground configuration, the span of the wing 1 is reduced (as compared to when the wing tip device 4 is in the flight configuration) and the aircraft 2 thus complies with the above-mentioned airport clearances etc. In this regard, in the ground configuration the span may be reduced such that the span (with the wing tip device in the ground configuration) is less than, or substantially equal to, the airport compatibility gate limit.

When the wing tip device 4 is in the ground configuration, the aircraft 2 incorporating the wing 1 is unsuitable for flight. In this regard, the wing tip device 4 is aerodynamically and structurally unsuitable for flight in the ground configuration. The aircraft 2 is configured such that, during flight, the wing tip device 4 is not moveable to the ground configuration. The aircraft 2 comprises a sensor for sensing when the aircraft 2 is in flight. When the sensor senses that the aircraft 2 is in flight, a control system is arranged to disable the possibility of moving the wing tip device 4 to the ground configuration.

Figure 3A:
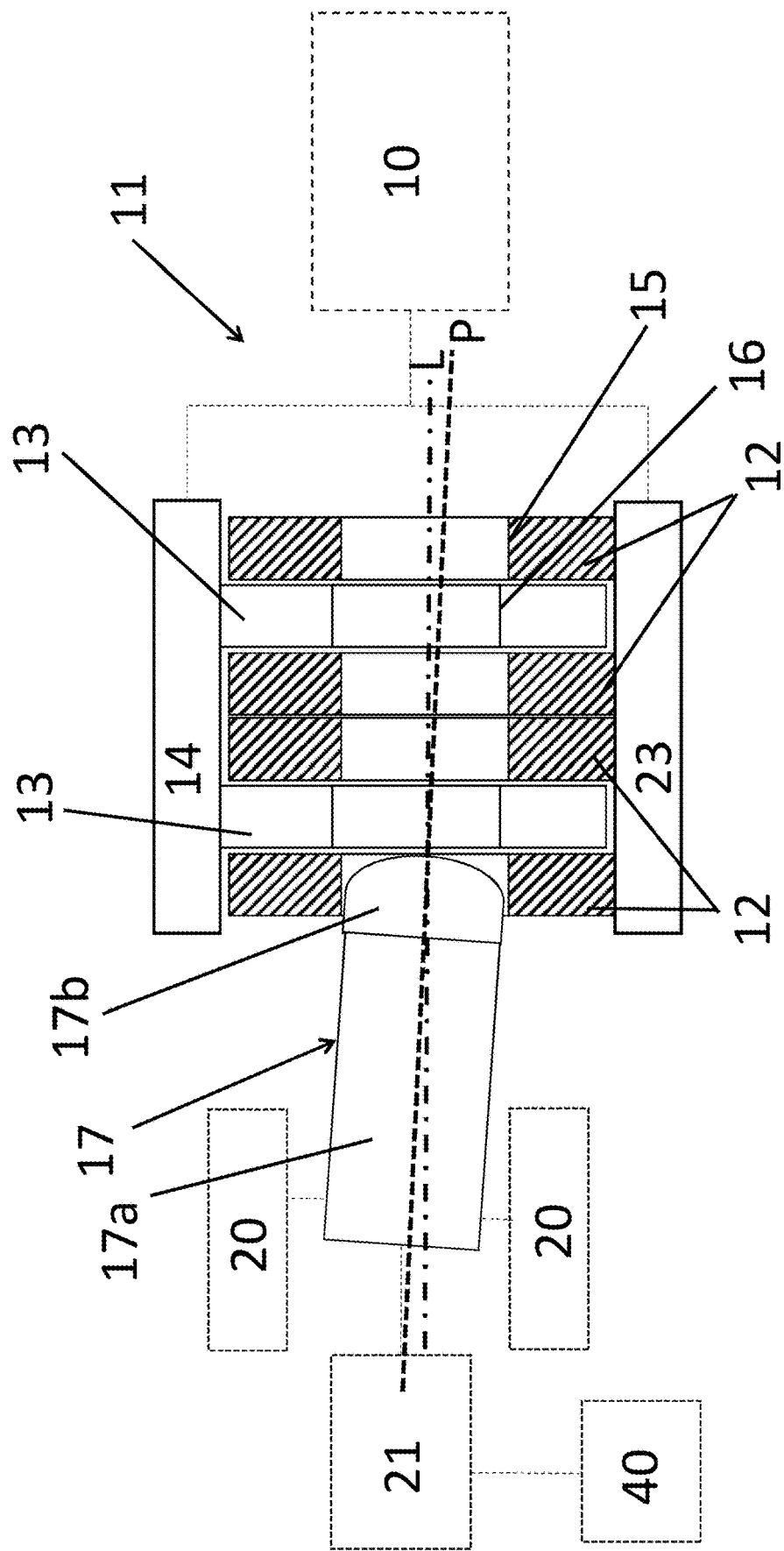
Figure 3F:
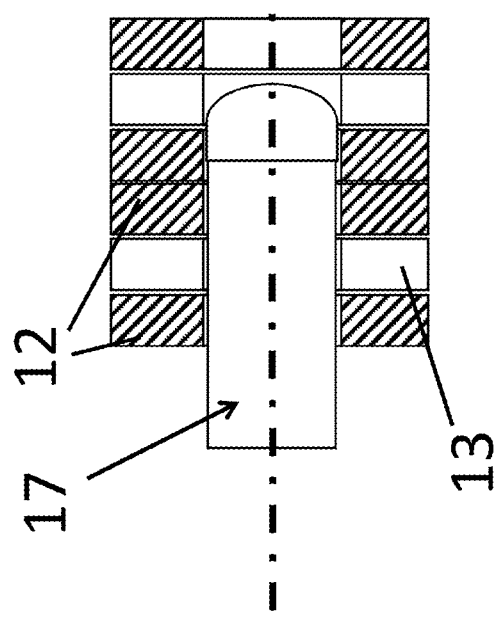
Figure 3G:
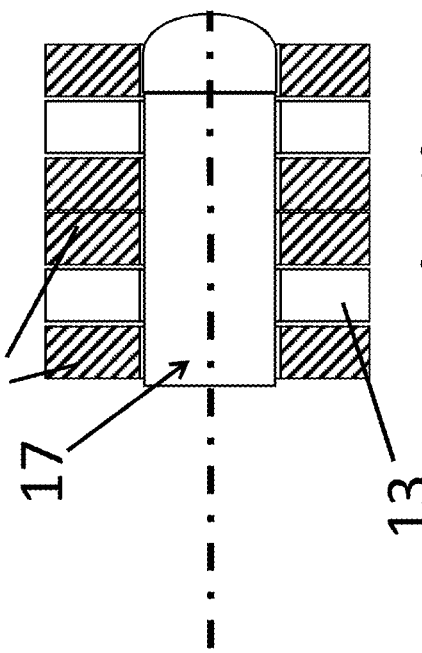
Figure 3H:
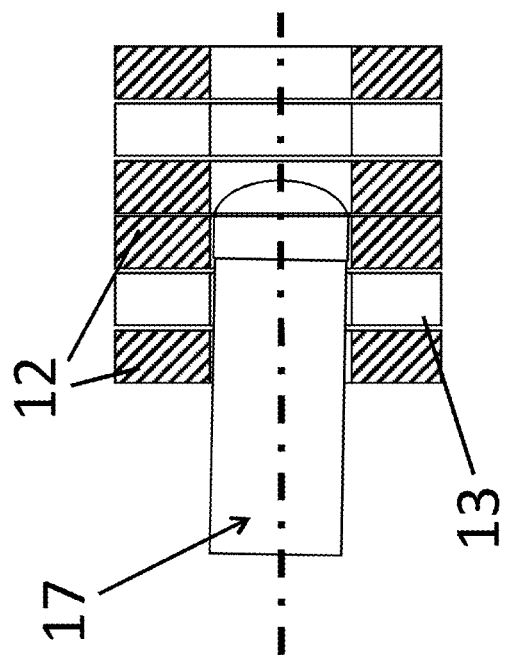

The aircraft wing 1 comprises a rotational joint 10 (shown schematically as box 10 in FIGS. 1a and 3a). The rotational joint 10 rotatably couples the wing tip device 4 to the fixed wing 3, to allow the wing tip device 4 to rotate between the flight and ground configurations 4a, 4b.

An example of a wing tip device 4 that is rotatable in this manner is shown in WO 2015/150835, the contents of which are herein incorporated by reference.

The aircraft 2 is arranged such that substantially all the aerodynamic and inertial loads on the wing tip device 4 during use of the aircraft, are transferred to the fixed wing 3, via the rotational joint 10.

The rotational joint 10 may be of any suitable type. For example, the rotational joint 10 may be of the 'piano-hinge' type, such as that disclosed in EP2899119 (The Boeing Company) or EP2727828 (The Boeing Company), or a slew-ring type such as that disclosed in EP3357808 (Airbus Operations Limited). Such rotational joints are known to the skilled person and so will not be described in further detail here.

The aircraft wing 1 further comprises a first locking mechanism 11 that is configured to selectively lock the wing tip device 4 in the flight configuration 4a.

The locking mechanism 11 comprises a first set of lugs 12, in this case four lugs 12, arranged into two adjacent pairs, that are attached to a part 23 of the fixed wing 3 such that they are fixed relative to the fixed wing 3. In the currently described embodiment each lug 12 is fixedly attached to the outboard end of the wing box 23 (shown schematically in FIG. 3A) of the fixed wing 3. It will be appreciated that one or more of the lugs 12 may be attached to a different component of the fixed wing 3, to that of the wing box 23, such that the lug 12 is fixed relative to the fixed wing 3.

The locking mechanism 11 also comprises a second set of lugs 13, in this case two lugs 13, that are attached to a part 14 of the wing tip device 4 such that they are fixed relative to the wing tip device 4, i.e. such that the lugs 13 rotate with the wing tip device 4, as it rotates between the flight and ground configurations 4a, 4b. In this respect, the lugs 13 rotate about a hinge line (not shown). In the currently described embodiment each lug 13 is fixedly attached to the inboard end of the wing box 14 (shown schematically in FIG. 3a) of the wing tip device 4. It will be appreciated that one or more of the lugs 13 may be attached to a different component of the wing tip device 4, to that of the wing box 14 of the wing tip device 4, such that the lugs 13 are fixed relative to the wing tip device 4.

Each of the lugs 12, 13 is generally annular and defines a central circular bore 15, 16 extending through the thickness of the lug 12, 13, along a longitudinal axis of the lug 12, 13.

The lugs 12, 13 are arranged such that when the wing tip device 4 is in the flight configuration 4a the lugs 13, that are fixed relative to the wing tip device 4, are interleaved between opposing lugs 12 in each pair of the lugs 12 that are fixed to the fixed wing 3.

When the wing tip device 4 is in the flight configuration 4a, the bores 16 of the lugs 13 fixed to the wing tip device 4 are generally aligned with the bores 15 of the lugs 12 fixed to the fixed wing 3, although there may be a degree of misalignment due to factors such as tolerances, deflections, wear effects and/or temperature changes, for example, as discussed further below.

The locking mechanism 11 further comprises a locking pin 17. The locking pin 17 extends from a rear end 18a to a tip end 18b, along a longitudinal axis P (see FIG. 2a).

It will be appreciated that the 'tip end' 18b refers to the front most end of the locking pin 17. The front most end may, for example, be a surface (e.g. where the tip end 18b is flat, for example a truncated dome shape) or a point (e.g. where the tip 17b is a pointed tip).

The terms 'front, forward, or the like' are in relation to the direction the locking pin 17 moves, relative to the locking bores 15, 16, as it is received in the locking bores 15, 16. In this respect, the front end 18b of the locking pin 17 is the end of the locking pin 17 that is received first in a locking bore 15, 16, as the locking pin is received in the locking bore 15, 16. The rear end 18a of the locking pin 17 is the opposite end.

The locking pin 17 comprises a front part in the form of a tip 17b and a rear part in the form of a body 17a of the pin 17. The tip 17b extends rearwardly from the tip end 18b, along a front section of the pin 17. The tip 17b is an axially extending section that, along its axial length, extends around substantially the entire circumference of the locking pin 17. As the tip 17b extends forwardly from the body 17a, it is initially cylindrical but then tapers to the tip end 18b to form a general dome shape.

The body 17a extends rearwardly from the tip 17b (i.e. from the rear end of the tip 17b) to the rear end 18a of the pin 17. The body 17a is an axially extending section that, along its axial length, extends around substantially the entire circumference of the locking pin 17. The body 17a is substantially cylindrical (i.e. it has a substantially constant diameter along its length).

Figure 3I:
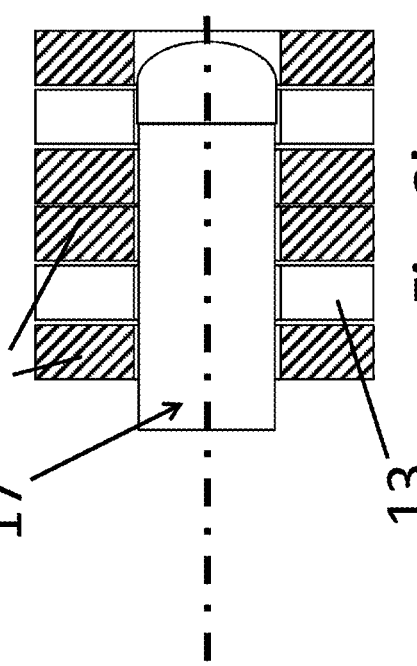
Figure 4B:
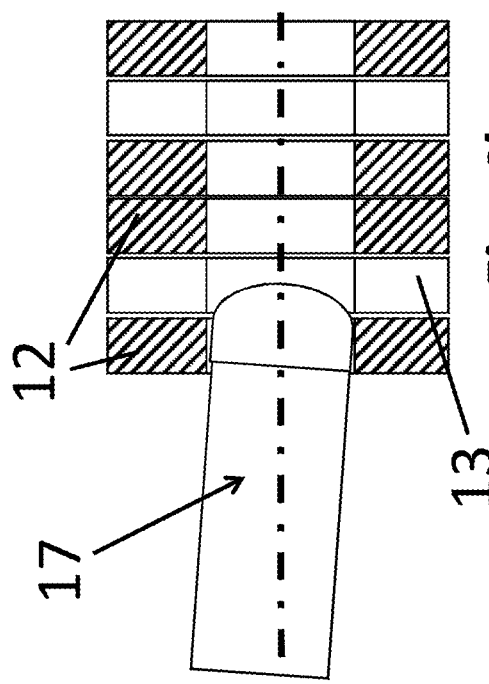
FIGS. 4a to 4h are schematic views, corresponding to those of FIGS. 3a to 3i, which sequentially show the locking mechanism moving from an unlocked configuration to a locked configuration, where the locking pin was initially misaligned with the locking bores in the lugs, but where the lugs of the wing tip device and the lugs of the fixed wing were initially aligned with each other.
Figure 4D:
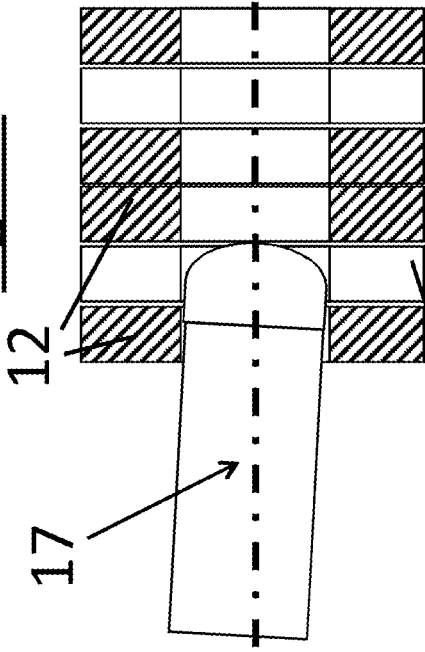
Figure 4A:
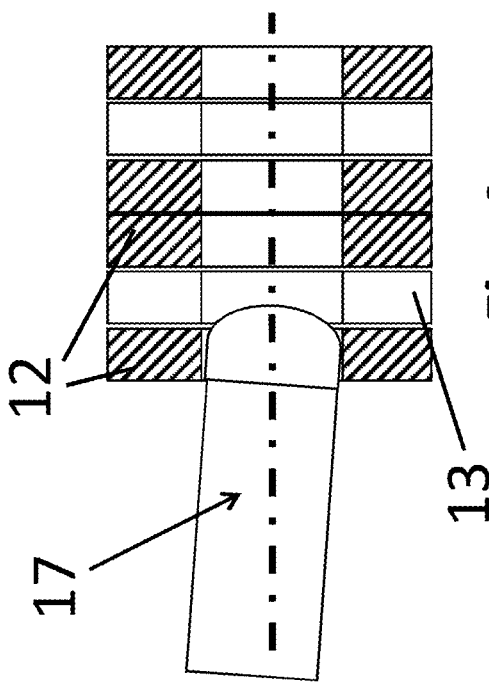
Figure 4C:
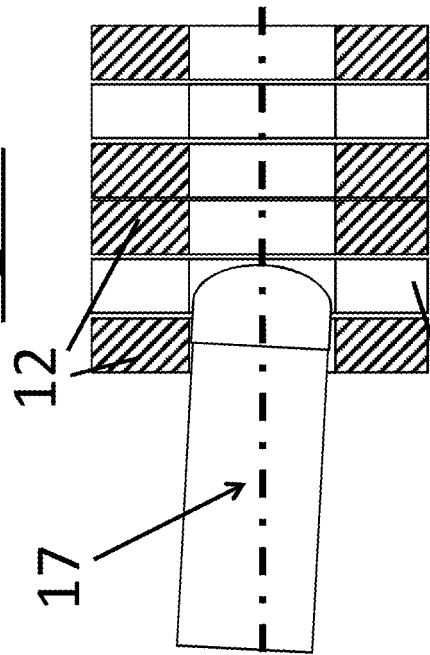
Figure 4E:
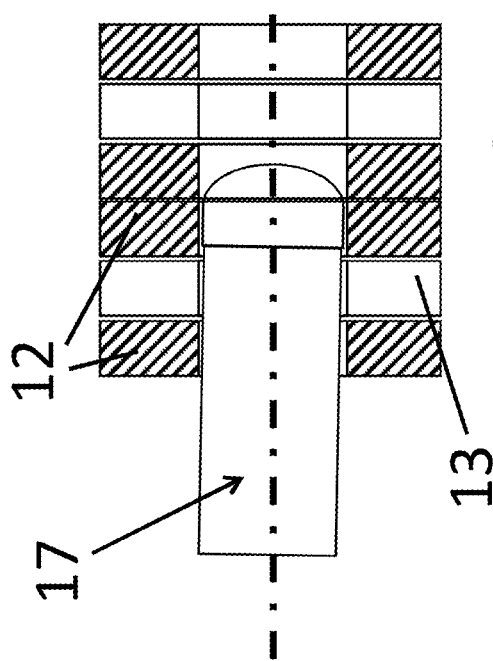
Figure 4F:
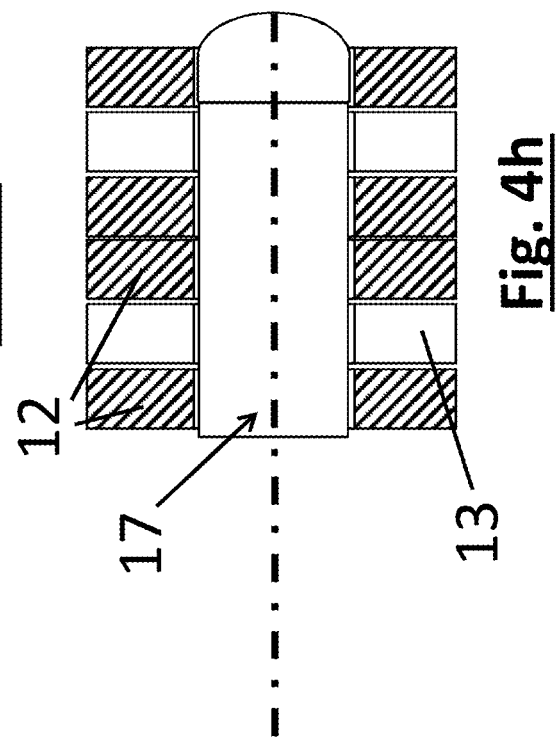
Figure 4G:
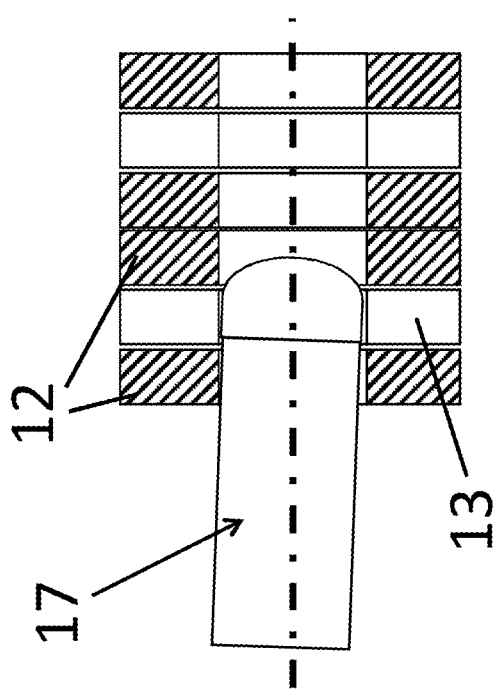
Figure 4H:
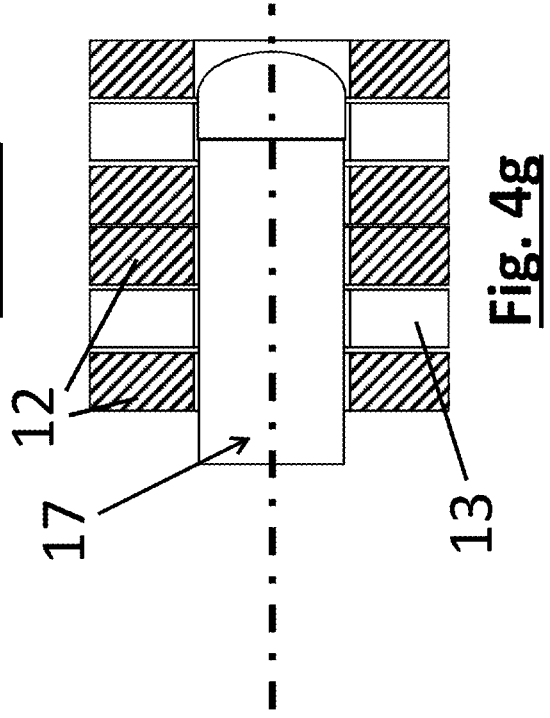

The locking pin 17 is mounted on a mounting structure 20 (shown schematically in FIG. 3a), in the fixed wing 3, for reciprocal movement between an unlocked position (shown in FIG. 3a) and a locked position (shown in FIG. 3i).

In order to move the locking mechanism 11 from its unlocked configuration to its locked configuration, the locking pin 17 is moved from its unlocked position (shown in FIG. 3a) to its locked position (shown in FIG. 3i).

An actuator 21 is connected to the locking pin 17 so as to move the locking pin between its locked and unlocked positions. In the currently described embodiment the actuator 21 is an electromechanical actuator in the form of a solenoid. However, it will be appreciated that any suitable type of actuator 21 may be used, including any mechanical, pneumatic or electrical actuator, for example.

A control unit 40 is connected to the actuator 21, to control the operation of the actuator. The control unit may be connected, at an input, to a pilot-operable control that a pilot operates to lock the wing tip device 4 in the flight configuration. Alternatively, the control unit 40 may be configured to automatically lock the wing tip device 4 in the flight configuration, when the wing device 4 has been moved to the flight configuration.

The mounting structure 20 is configured to also provide a floating mounting such that the locking pin 17 is movably mounted such that as the locking pin 17 is moved to its locked position, the locking pin 17 can align itself with the locking bores 15, 16 in the lugs 12, 13.

In the currently described embodiment the floating mounting 20 is such that the locking pin 17 is rotatable to provide this alignment. In an alternative embodiment, the floating mounting 20 may be such that the locking pin 17 can translate in a plane perpendicular to the longitudinal axis of the locking pin 17, for example in any direction perpendicular to the longitudinal axis of the locking pin 17.

The mounting structure 20, and its floating mounting, may be of any suitable type including, for example, of the type disclosed in EP 3069988 (Airbus Operations Limited). Such a mounting structure, and floating mounting, is known to the skilled person and so will not be described in any further detail in the present application.

When the locking pin 17 is in its unlocked position (see FIG. 3a), the tip 17b of the locking pin 17 is located in the rear most lug 12 of the fixed wing 3, i.e. the first of the lugs 12 in the sequence of lugs 12, 13 along the direction of movement of the locking pin 17 as it moves from its unlocked position to its locked position.

In this position, the tip 17b of the locking pin 17 does not protrude out of the forward end of the bore 15 and so does not protrude into the bore 16 of the adjacent lug 13 (that is fixed to the wingtip device 4) in the forward direction (nor into the bores 16 of any of the other lugs 13 that are fixed to the wingtip device 4). Accordingly, when the locking pin 17 is in its unlocked position, the wing tip device 4 is free to rotate between its flight and ground configurations 4a, 4b.

In FIG. 3a, the wingtip device 4 has been moved into the flight configuration 4a. However, due to factors such as tolerances, deflections, wear effects and/or temperature changes, for example, there is a degree of misalignment between the lugs 13 fixed to the wing tip device 4 and the lugs 12 fixed to the fixed wing 3, which results in a degree of misalignment between the respective bores 15, 16 of the lugs 12, 13.

Additionally, or alternatively, when the locking pin 17 is in its unlocked position (see FIG. 3a), the locking pin 17 may be misaligned with the locking bores 15, 16 due to its floating mounting 20.

In this respect, in FIG. 3a, when locking pin 17 is in its unlocked position, it is in an orientation in which its longitudinal axis (P) is inclined downwardly relative to the longitudinal axis (L) of the bores 15, 16 (i.e. the common longitudinal axis (L) of the bores 15, 16 when they are aligned, which may be referred to as the 'latch line'.).

Due to this misalignment, as the locking pin 17 moves through the bores 15, 16 to its locked position, the tip 17b of the locking pin 17 abuts against the inner surfaces of the lugs 12, 13 that define the bores 15, 16.

As the locking pin 17 moves through the bores 15, 16, the tapered shape, of the tip 17b, through its contact with the surfaces of the lugs 12, 13 that define the bores 15, 16, acts to rotate the locking pin 17, on its floating mounting 20, into alignment with the bores 15, 16 (i.e. such that its longitudinal axis (P) is coincident with the longitudinal axis (L) of the bores 15, 16) and to push the lugs 13, that are fixed to the wingtip device 4, into alignment with the lugs 12 that are fixed to the fixed wing 3, such that the bores 15, 16 are aligned.

FIGS. 4a to 4h shows views corresponding to those of FIGS. 3a to 3i, where the locking pin 17 was initially misaligned with the locking bores 15, 16 in the lugs 12, 13, but where the lugs 12, 13 were initially aligned with each other.

In this case, although the tapered shape of the locking pin tip 17b does not act to push the lugs 12, 13 into alignment, it still acts to rotate the locking pin 17, on its floating mounting 20, into alignment with the bores 15, 16.

The above arrangement of floating mounting and tapered section 19b of the locking pin 17 advantageously allows for a degree of misalignment between the locking pin 17 and the lugs 12, 13, when the locking mechanism 11 is in its unlocked configuration.

However, the contact between the locking pin tip 17b and the surfaces of the lugs 12, 13 that define the bores 15, 16, as the locking pin 17 moves to its locked position, can cause a relatively high degree of wear on the locking pin tip 17b.

The locking pin 17 is configured such that it has a replaceable tip 17b.

Figures 2A, 2B, 2C, 2D:
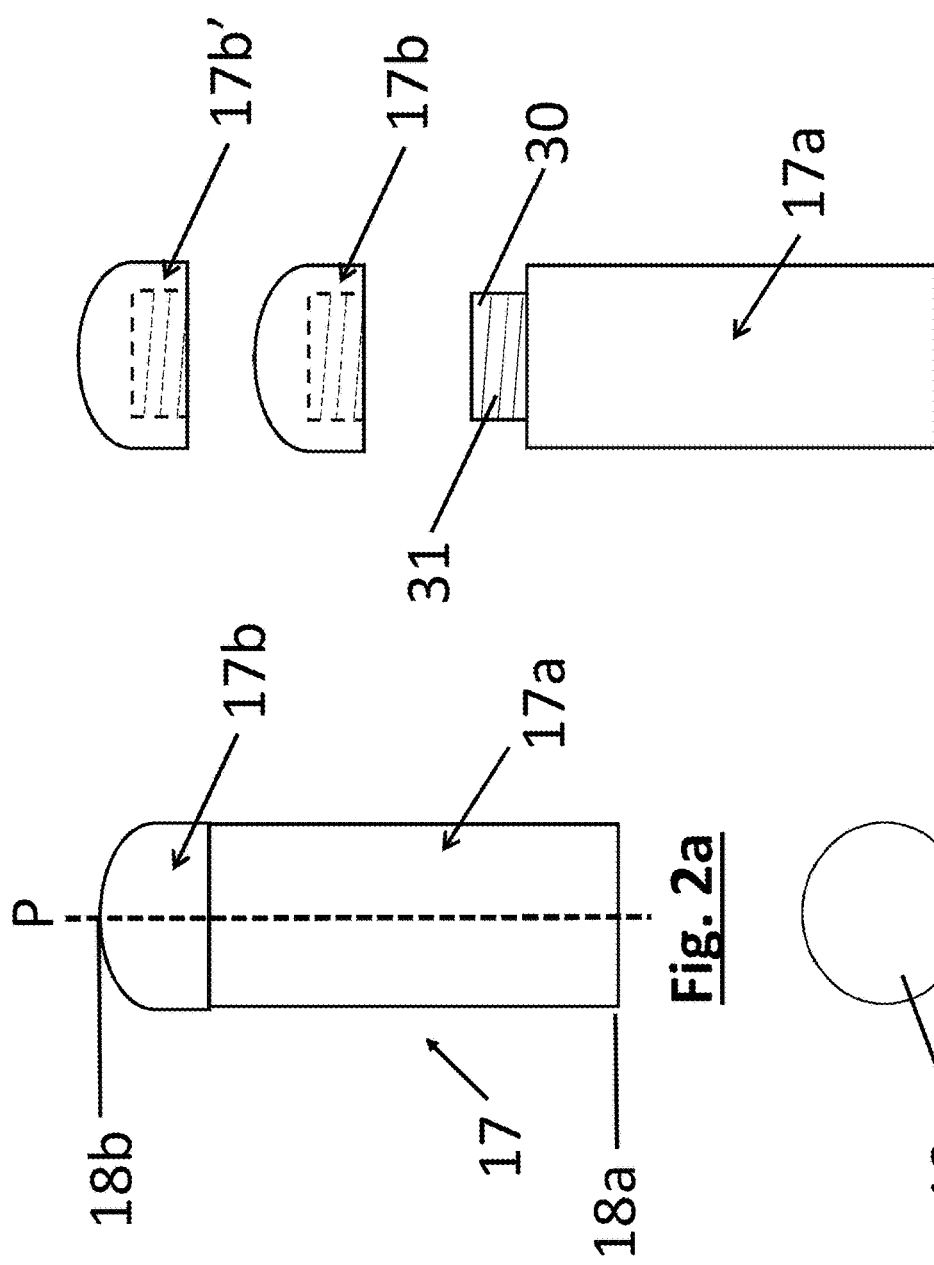

In this respect, the locking pin 17 is configured such that the tip 17b is detachable from the body 17a and the body 17a is attachable to a corresponding replacement tip 17b' (see FIG. 2c).

The tip 17b is releasably attachable to the body 17a of the locking pin 17, to allow for replacement of the tip 17b, for example following wear of the tip 17b. In this respect, the tip 17b is selectively attachable and detachable to the body 17a of the locking pin 17.

In the currently described embodiment, the front end of the locking pin body 17a is provided with a connector in the form of a protruding stem 30 with an external screw thread 31 (see FIG. 2c).

The tip 17b is provided with a cooperating connector in the form of an internal threaded bore 17b that is configured to engage with the threaded stem 30, of the body 17a, such that the tip 17b is selectively attachable to, and detachable from, the body 17a.

It will be appreciated that any suitable means of selectively attaching and attaching the tip 17b to the body 17a may be used. For example, the body 17a and tip 17b may each be provided with one or more bores that are aligned, when the body 17a and tip 17b are assembled together, with a fastener (e.g. a screw or pin) received in the bores to attach the tip 17b to the body.

As a further example, a resilient member (e.g. a clip, such as a circlip) may be be mounted on the assembled tip 17b and body 17a to attach the tip 17b to the body 17a.

As a further example, the body 17a and tip 17b may be selectively attachable by an interference fit (e.g. a press fit, friction fit, shrink fit, etc.). It will be appreciated that, in this case, the abutting surfaces of the body 17a and tip 17b may form the connector and cooperating connectors respectively.

Providing the locking pin 17 with a replaceable tip 17b may advantageously allow the tip 17b to be replaced, for example due to wear of the tip 17b, in a relatively simple, fast and cost effective way. In this respect, the tip 17b of the pin 17 (which is typically the part of the pin that is subject to the most wear) may be replaced without having to replace the body 17a of the pin 17.

This is particularly advantageous with a locking pin 17 used to lock a wingtip device 4 in a flight or ground configuration, due to the relatively large forces involved (due to the large weight of the wing tip device 4), which can cause a high degree of wear on the locking pin tip 17b.

This is further particularly advantageous where the locking pin 17 has such a floating mounting 20, as in the described embodiment, due to the relatively high degree of contact between the tip 17b and the surfaces 12, 13 of the lugs 15, 16, as the pin 17 moves from its unlocked position to the locked position.

The tip 17b of the locking pin 17 is of a material that is softer than the surfaces of the lugs 12, 13 that define the locking bores 15, 16. The tip 17b is of a material that is softer than the body 17a. This advantageously provides wear of the replaceable pin tip 17b, instead of the body 17a or lugs 12, 13. In the currently described embodiment the tip 17b is made of a self lubricating (oil impregnated) bronze alloy and the body 17a is made of stainless steel. and the inner surfaces of the lugs 12, 13 that define the bores 15, 16 are made of 7000 series Aluminium alloy. However, it will be appreciated that any suitable material may be used, including a metallic alloy, for example an Aluminium Alloy, Titanium, Steel, a composite material, etc.

Figure 5:
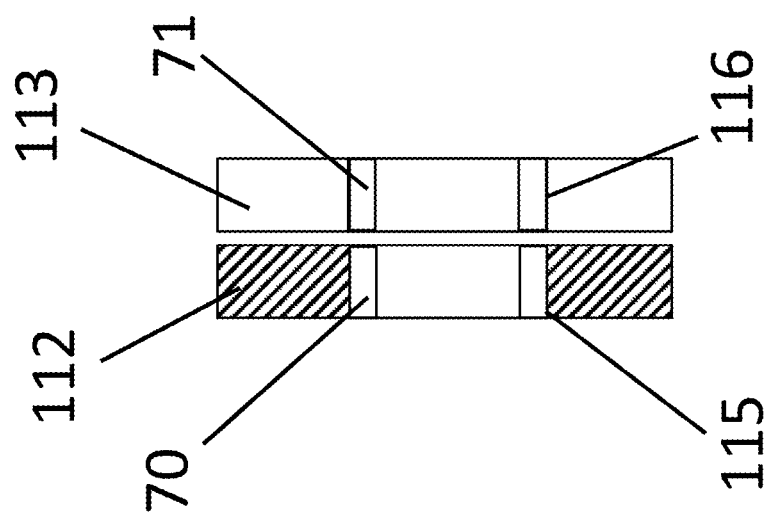
FIG. 5 shows a cross-sectional view of a front pair of lugs of a locking mechanism of an aircraft wing according to a second embodiment of the invention.

Referring to FIG. 5, there is shown a cross-sectional view of a front pair of lugs of a locking mechanism of an aircraft wing according to a second embodiment of the invention. The locking mechanism is the same as that of the first embodiment, except for the differences described below. Corresponding features are given corresponding reference numerals, incremented by 100.

It will be appreciated that only the front pair of lugs 112, 113 are shown in FIG. 5 and that the further lugs 112, 113 are omitted for illustrative purposes.

The locking mechanism of the second embodiment differs from that of the first embodiment in that a bush 70, 71 is provided in each bore 115, 116. Each bush 70, 71 is annular and lines the inner surface of the lug 112, 113 that defines the bore 115, 116.

The tip 17b is of a material that is softer than each bush 70, 71. This advantageously provides wear of the replaceable pin tip 17b, instead of each bush 70, 71.

In the currently described embodiment, each bush 70, 71 is made of a Nickel Bronze alloy. However, it will be appreciated that any suitable material may be used.

The aircraft wing 1 further comprises a second locking mechanism (not shown), that is identical to the first locking mechanism 11 described above, but configured to selectively lock the wing tip device 4 in the ground configuration 4b.

Whilst the present invention has been described and illustrated with reference to particular embodiments, it will be appreciated by those of ordinary skill in the art that the invention lends itself to many different variations not specifically illustrated herein.

For example, in the currently described embodiment the locking pin 17 is movable between its locked and unlocked positions. Alternatively or additionally, the lugs 12, 13 may be movable (e.g. by being movably mounted to the wing tip device 4) for movement between a locked position, in which the locking pin 17 is received in the locking bores 15, 16 and an unlocked position in which the locking pin 17 is withdrawn from the locking bores 15, 16.

In the currently described embodiment the locking pin 17 is mounted to the fixed wing 3, the lugs 12 are fixed to the fixed wing 3 and the lugs 13 are fixed to the wing tip device 4. Alternatively, the locking pin 17 may be mounted to the wing tip device 4, with the lugs 12 fixed to the wing tip device 4 and the lugs 13 fixed to the fixed wing 3.

The number and arrangement of the lugs 12, 13 may be varied. In this respect, the locking mechanism may have a single lug 13 that is fixed relative to the wing tip device 4, with the locking pin 17 mounted to the fixed wing 3 for reciprocal movement between its unlocked position, in which it is withdrawn from the lug 13 and its locked position in which it is received in the lug 13 to lock the wing tip device in one of the flight or ground configurations. Alternatively, the locking mechanism may comprise a single lug 13 fixed to the fixed wing 3, where the locking pin 17 is mounted to the wing tip device 4.

In the currently described embodiment the locking pin 17 is provided with a tapered section 19b to urge the locking pin 17 and lugs 12, 13 into alignment. Alternatively, or additionally, one or more of the bores 15, 16 may be tapered so as to provide this alignment.

In the current described embodiment the locking pin 17 is mounted on the floating mounting 20, such that it is able to rotate, as it moves from its unlocked position to is locked position, so as to align itself with the lugs 12, 13 and to align the lugs 12, 13 with each other. Alternatively, or additionally, one or both sets of the lugs 12, 13 may be mounted on such a floating mounting arrangement such that the lugs 12, 13 may be movable into alignment with each other and/or the locking pin 17 as locking pin 17 is moved from its unlocked position to its locked position.

Although, as described above, the replaceable tip 17b is particularly advantageous where the locking pin 17, or lugs 12, 13, have a floating mounting, such a floating mounting arrangement may be omitted. In this case, the replaceable tip 17b is still advantageous as wear can still occur on the locking pin tip 17b due to contact between the tip 17b and the surfaces of the lugs 12, 13 that define the bores 15, 16, due to misalignment of the lugs 12, 13.

The shape of the pin may be varied. In this respect, the pin might be elongate or might not be elongate (i.e. it could have a width equal to its length), it could have any cross-sectional shape, including circular, square, rectangular, etc. Its cross-sectional shape may vary across its length. It may be solid, or hollow, for example.

In the currently described embodiment the wing tip device is rotatable relative to the fixed wing between the flight and ground configurations. Alternatively, or additionally, the wing tip device may be movable in translation, relative to the fixed wing, between the flight and configurations (e.g. mounted so as to slide relative to the fixed wing to vary the span of the wing).

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments. Where 'or' is used in the foregoing description, this it to be taken to mean 'and/or'.

The invention claimed is:

1. An aircraft wing comprising a fixed wing and a wing tip device at the tip of the fixed wing, the wing tip device being movable relative to the fixed wing between:
   a flight configuration for use during flight, and
   a ground configuration for use during ground-based operations, in which ground configuration the wing tip device is moved relative to the fixed wing such that the span of the wing is reduced,
   the aircraft wing having a locking mechanism comprising a locking bore and a locking pin, the locking mechanism being configurable between a locked configuration, in which the locking pin is received in the locking bore, to lock the wing tip device in one of the flight or ground configurations, and an unlocked configuration in which the locking pin is withdrawn from the locking bore such that the wing tip device is moveable relative to the fixed wing,
   wherein the locking pin is configured such that it has a replaceable tip, and
   wherein the locking pin is floating mounted such that as the locking mechanism is moved to the locked configuration, the locking pin can change its orientation in any direction with respect to the locking bore.

2. An aircraft wing according to claim 1 wherein the locking pin comprises a body and the locking pin is configured such that the tip is detachable from the body and the body is attachable to a replacement tip.

3. An aircraft wing according to claim 2 wherein the body comprises a connector and the locking pin comprises a cooperating connector, wherein the connector and cooperating connector are disengageable and engageable with each other such that the tip is detachable from the body and a replacement tip is attachable to the body by engaging the connector and a corresponding cooperating connector associated with the replacement tip, with each other.

4. An aircraft wing according to claim 1 wherein the locking pin comprises a body and the locking pin is configured such that the tip is releasably attachable to the body.

5. An aircraft wing according to claim 1 wherein the replaceable tip is of a material that is softer than a surface that the tip comes into contact with as the locking pin is received in the locking bore.

6. An aircraft wing according to claim 5 wherein a bush is provided in the locking bore and the replaceable tip is of a material that is softer than the bush.

7. An aircraft wing according to claim 1 wherein the locking pin comprises a body and the tip, the tip being selectively attachable to the body, and wherein the tip is of a material that is softer than that of the body.

8. An aircraft wing according to claim 1 wherein the locking pin and/or locking bore is movably mounted such that as the locking mechanism is moved to the locked configuration, the locking pin or locking bore can align itself with the locking bore or locking pin respectively.

9. An aircraft wing according to claim 1 wherein at least one of the locking pin has a surface, or the locking bore is defined by a surface, that is configured to urge the locking pin and locking bore into alignment, as the locking mechanism is moved to the locked configuration.

10. An aircraft comprising an aircraft wing according to claim 1.

11. An aircraft wing according to claim 1 in combination with a replacement tip for the locking pin.

12. An aircraft wing comprising a fixed wing and a wing tip device at the tip of the fixed wing, the wing tip device being movable relative to the fixed wing between:
   a flight configuration for use during flight, and
   a ground configuration for use during ground-based operations, in which ground configuration the wing tip device is moved relative to the fixed wing such that the span of the wing is reduced,
   the aircraft wing having a locking mechanism comprising a locking bore and a locking pin, the locking mechanism being configurable between a locked configuration, in which the locking pin is received in the locking bore, to lock the wing tip device in one of the flight or ground configurations, and an unlocked configuration in which the locking pin is withdrawn from the locking bore such that the wing tip device is moveable relative to the fixed wing,
   wherein the locking pin comprises a body and a tip that is selectively attachable to the body, and
   wherein the locking pin is floating mounted such that as the locking mechanism is moved to the locked configuration, the locking pin can change its orientation in any direction with respect to the locking bore.

13. A kit of parts comprising a fixed wing and a wing tip device configured to be mounted at the tip of the fixed wing and to be movable relative to the fixed wing between:
   a flight configuration for use during flight, and
   a ground configuration for use during ground-based operations, in which ground configuration the wing tip device is moved relative to the fixed wing such that the span of the wing is reduced,
   the kit of parts comprising a locking bore and a locking pin configured to, in use, form a locking mechanism configurable between a locked configuration, in which the locking pin is received in the locking bore, to lock the wing tip device in one of the flight or ground configurations, and an unlocked configuration in which
   the locking pin is withdrawn from the locking bore such that the wing tip device is moveable relative to the fixed wing,
   wherein the locking pin is configured such that it has a replaceable tip,
   wherein the locking pin is floating mounted such that as the locking mechanism is moved to the locked configuration, the locking pin can change its orientation in any direction with respect to the locking bore.

14. A kit of parts according to claim 13 wherein the locking pin comprises a body and the locking pin is configured such that the tip is detachable from the body and the body is attachable to a replacement tip.

15. A kit of parts according to claim 14 wherein the tip is detached from the body.

16. A kit of parts according to claim 13 wherein the kit of parts further comprises a replacement tip for the locking pin.

17. A method of locking a wing tip device of an aircraft wing in a flight or ground configuration, the aircraft wing comprising a fixed wing and a wing tip device at the tip of the fixed wing, the wing tip device being moveable relative to the fixed wing between:
   a flight configuration for use during flight, and
   a ground configuration for use during ground-based operations, in which ground configuration the wing tip device is moved relative to the fixed wing such that the span of the wing is reduced,
   the aircraft wing having a locking mechanism comprising a locking bore and a locking pin, the locking mechanism being configurable between a locked configuration, in which the locking pin is received in the locking bore, to lock the wing tip device in one of the flight or ground configurations, and an unlocked configuration in which the locking pin is withdrawn from the locking bore such that the wing tip device is moveable relative to the fixed wing,
   wherein the locking pin is configured such that it has a replaceable tip,
   wherein the locking pin is floating mounted such that as the locking mechanism is moved to the locked configuration, the locking pin can change its orientation in any direction with respect to the locking bore,
   and the method comprises moving the locking mechanism from its unlocked configuration to its locked configuration.

18. A method of unlocking a wing tip device of an aircraft wing from a flight or ground configuration, the aircraft wing comprising a fixed wing and a wing tip device at the tip of the fixed wing, the wing tip device being movable relative to the fixed wing between:
   a flight configuration for use during flight, and
   a ground configuration for use during ground-based operations, in which ground configuration the wing tip device is moved relative to the fixed wing such that the span of the wing is reduced,
   the aircraft wing having a locking mechanism comprising a locking bore and a locking pin, the locking mechanism being configurable between a locked configuration, in which the locking pin is received in the locking bore, to lock the wing tip device in one of the flight or ground configurations, and an unlocked configuration in which the locking pin is withdrawn from the locking bore such that the wing tip device is moveable relative to the fixed wing,
   wherein the locking pin is configured such that it has a replaceable tip, wherein the locking pin is floating mounted such that as the locking mechanism is moved to the locked configuration, the locking pin can change its orientation in any direction with respect to the locking bore, and the method comprises moving the locking mechanism from its locked configuration to its unlocked configuration.

19. A method of changing the configuration of a wing tip device from one of a flight or ground configuration to the other of a flight or ground configuration, wherein the method comprises unlocking the wing tip device from one of the flight or ground configurations according to the method of claim 18, moving the wing tip device to the other of the flight or ground configurations and locking the wing tip device in that configuration.

20. A method of replacing the tip of a locking pin of a locking mechanism of an aircraft wing, the aircraft wing comprising a fixed wing and a wing tip device at the tip of the fixed wing, the wing tip device being movable relative to the fixed wing between:

a flight configuration for use during flight, and a ground configuration for use during ground-based operations, in which ground configuration the wing tip device is moved relative to the fixed wing such that the span of the wing is reduced, the aircraft wing having a locking mechanism comprising a locking bore and a locking pin, the locking mechanism being configurable between a locked configuration, in which the locking pin is received in the locking bore, to lock the wing tip device in one of the flight or ground configurations, and an unlocked configuration in which the locking pin is withdrawn from the locking bore such that the wing tip device is moveable relative to the fixed wing, wherein the locking pin is configured such that it has a replaceable tip, wherein the locking pin is floating mounted such that as the locking mechanism is moved to the locked configuration, the locking pin can change its orientation in any direction with respect to the locking bore, and wherein the method comprises replacing the tip of the locking pin.

\* \* \* \* \*